Oct. 9, 1956   W. P. OEHLER ET AL   2,765,610
DISK HARROW

Filed Aug. 2, 1951   4 Sheets-Sheet 1

INVENTORS.
WILLIAM P. OEHLER
CHARLES H. YOUNGBERG
BY
ATTORNEYS

INVENTORS.
WILLIAM P. OEHLER
CHARLES H. YOUNGBERG
BY
ATTORNEYS

Oct. 9, 1956 W. P. OEHLER ET AL 2,765,610
DISK HARROW
Filed Aug. 2, 1951 4 Sheets-Sheet 3

INVENTORS.
WILLIAM P. OEHLER
CHARLES H. YOUNGBERG
BY
ATTORNEYS

Oct. 9, 1956  W. P. OEHLER ET AL  2,765,610
DISK HARROW
Filed Aug. 2, 1951  4 Sheets-Sheet 4

INVENTORS.
WILLIAM P. OEHLER
CHARLES H. YOUNGBERG
BY
ATTORNEYS

United States Patent Office 2,765,610
Patented Oct. 9, 1956

2,765,610

DISK HARROW

William P. Oehler and Charles H. Youngberg, Moline, Ill., assignors to Deere & Company, Moline, Ill., a corporation of Illinois Application August 2, 1951, Serial No. 239,922

13 Claims. (Cl. 55—73)

The present invention relates generally to agricultural implements and more particularly to ground-working implements, such as disk harrows and the like.

The object and general nature of the present invention is the provision of a new and improved disk harrow which is particularly constructed and arranged for connection to a farm tractor, preferably at the rear thereof, the hitch connections being such that the power lift of the tractor may be utilized for raising and lowering the disk harrow bodily into and out of a lifted or transport position in which the harrow is carried entirely out of contact with the ground. In harrows of this type it is therefore unnecessary to change the angle of the gangs when transporting the implement, whereas in trailing or towed disk harrows it is usually necessary to straighten the gangs so that the disks roll forward about parallel axes during transport.

A further and important feature of the present invention is the provision of a disk harrow which includes a main frame to which the inner ends of front and rear gangs are pivotally connected, with means at the forward end of the main frame of the harrow providing for the reception of connecting means that establishes the hitch and lifting connections between the harrow and the power lift mechanism of the tractor, and still further, an additional feature of the present invention is the provision of new and improved hitch frame means providing a readily adaptable connection between the disk harrow and different kinds of tractors and/or power lift equipment. More specifically, it is an additional feature of this invention to provide a hitch device adapted to be connected in trailing relation with the rear end of a tractor, preferably of the type having a hydraulic power lift mechanism, with generally vertically swingable ground wheels supporting the rear portion of the hitch device, and the latter having attachment means by which the harrow may readily be connected to the rear portion of the hitch device and the power lift mechanism of the tractor connected to swing the ground wheels of the hitch device for the purpose of bodily raising and lowering the disk harrow into and out of a transport position.

Still further, another feature of this invention is the provision of new and improved adjusting means for leveling the harrow in operation in a generally fore-and-aft direction irrespective of the particular hitch device or the particular type of tractor to which the harrow is hitched.

These and other objects and advantages of the present invention will be apparent to those skilled in the art after a consideration of the following detailed description, taken in conjunction with the accompanying drawings, in which:

Figures 5 and 6 show the details of a wheel-supported hitch frame by which the harrow may be connected to any tractor having a drawbar or the like.

Figure 1:
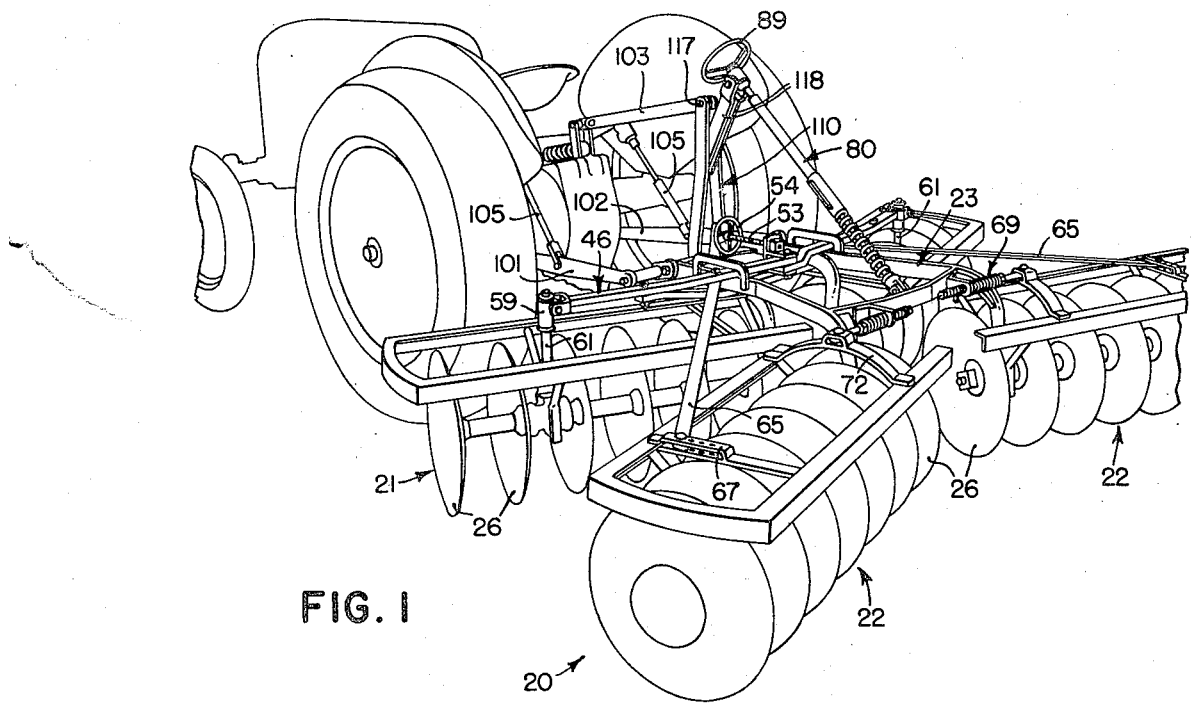
Figure 1 is a perspective view of our improved disk harrow, showing the same as connected to a conventional tractor having a rear hydraulically controlled linkage.
Figure 2:
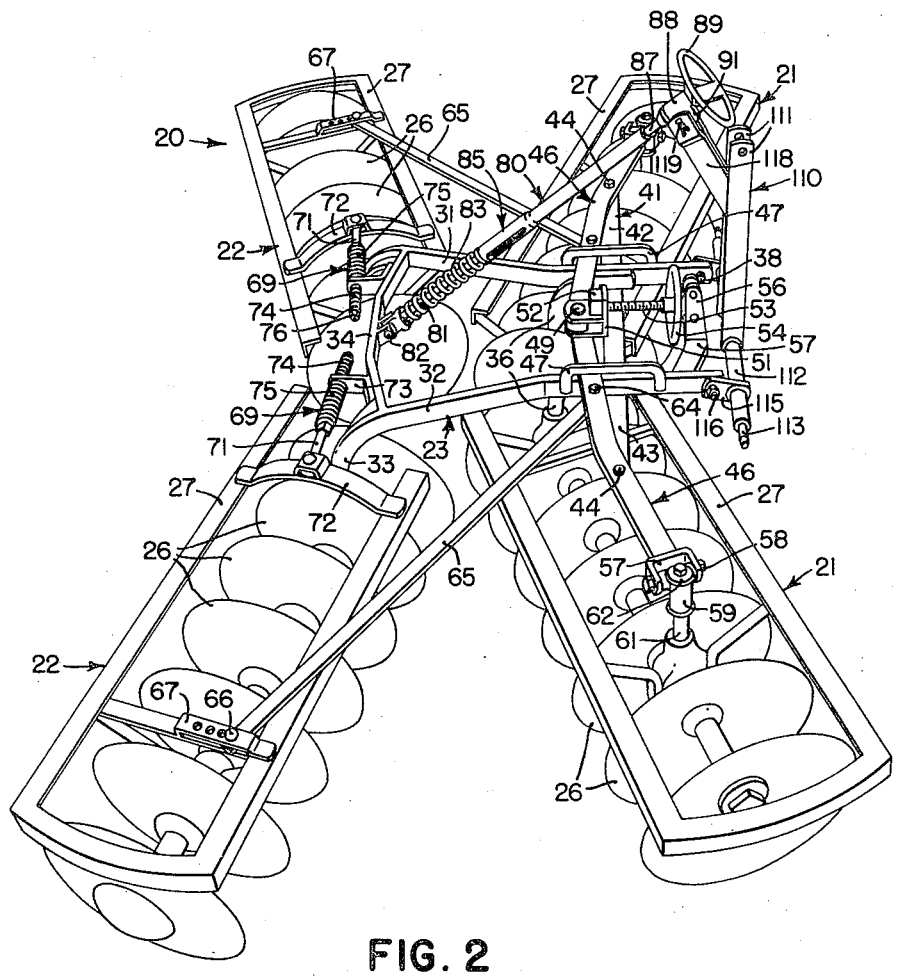
Figure 2 is an enlarged perspective view of the harrow, shown as detached from the tractor, and the associated hitch frame by which the harrow may be connected with the type of tractor shown in Figure 1.
Figure 3:
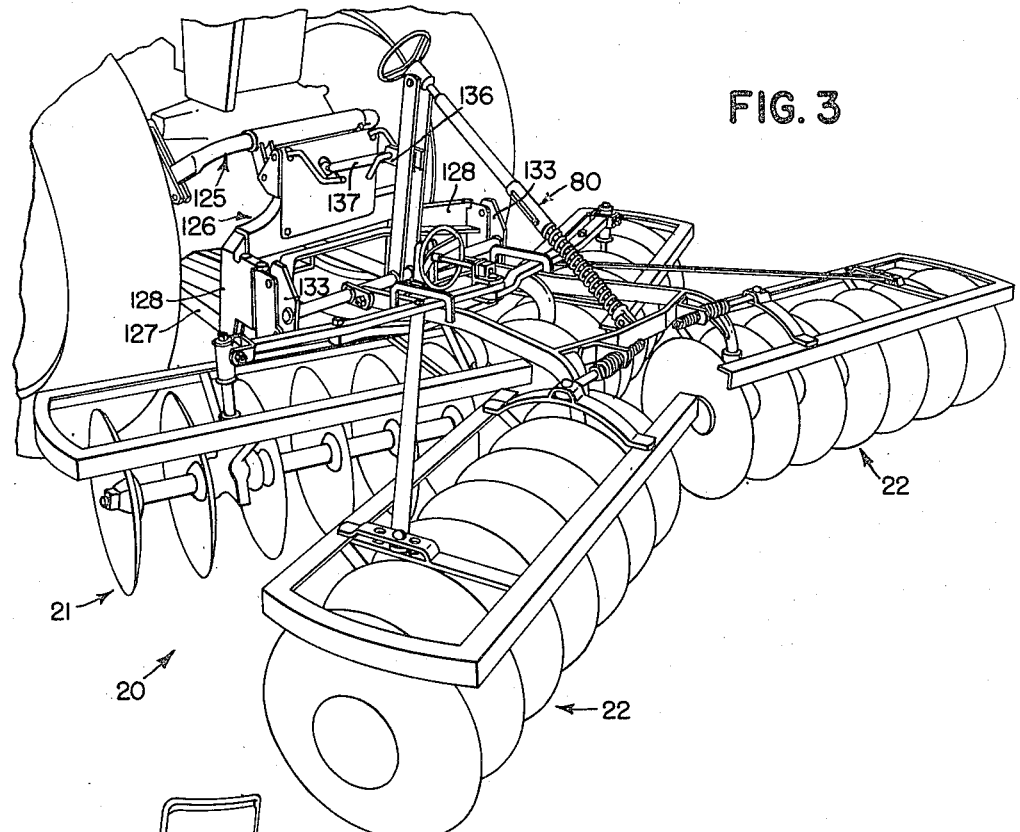
Figures 3 and 4 are perspective views, showing the details of a slightly different form of hitch frame by which the harrow of the present invention may be connected with a different form of tractor-carried power lift linkage.
Figure 4:
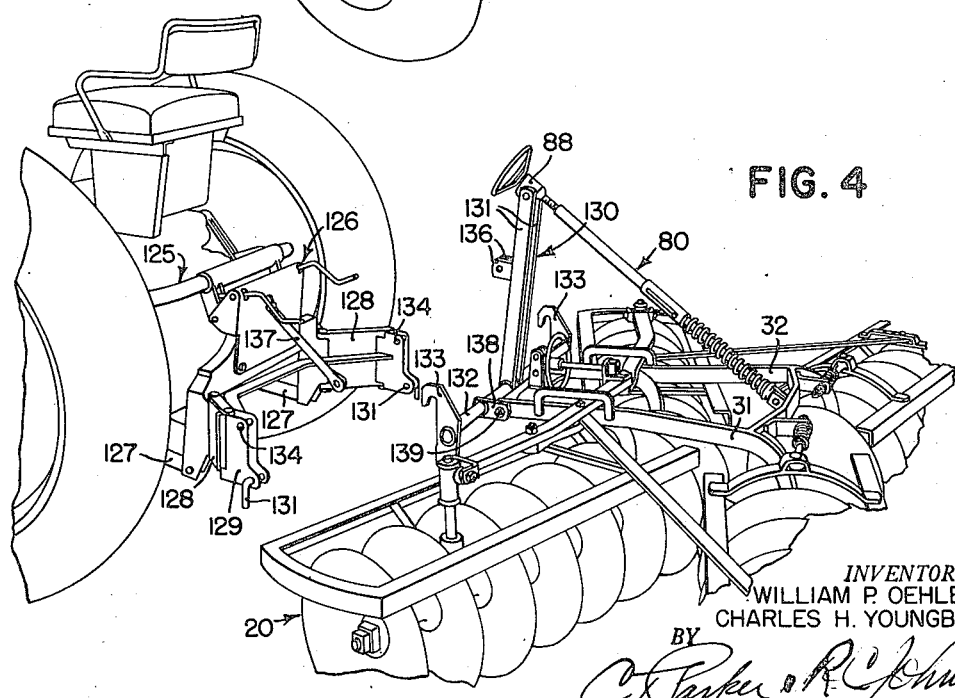

Referring now to the drawings, the disk harrow itself will first be described, followed by a description of the several hitch frames and associated power lift actuated connections with which the harrow of the present invention is particularly adapted to cooperate.

The disk harrow is indicated in its entirety by the reference numeral 20 and, as shown, comprises a pair of front gangs 21 and a pair of rear gangs 22 pivotally connected at their laterally inner ends to a main harrow frame 23. The gangs 21 and 22 are per se of generally conventional construction, comprising essentially a gang of disks 26 interconnected together by a suitable gang bolt and spacing sleeves, each gang having suitable bearings by which an associated gang frame 27 is supported on the gang.

The main harrow frame 23 comprises a pair of laterally spaced apart, generally fore-and-aft extending frame bars 31 and 32, the rear portions of which are bent downwardly to form downwardly extending, gang-receiving standards 33. The rear end portions of the frame bars 31 and 32 are rigidly connected together by a crossbar 34, secured as by welding to the rear portions of the frame bars 31 and 32 just forward of the downwardly extending standard sections 33. The rearward portions of the frame bars 31 and 32 are arranged in rearwardly diverging relation while the forward portions extend generally in parallelism. Secured, as by welding, to the rear portions of the parallel sections are front standard members 36, the lower ends of which extend into the upwardly extending sockets of the bearings at the laterally inner ends of the front gangs 21. The bearings at the laterally inner ends of the rear gangs 22 are of like or similar construction, these bearings and associated parts being substantially like that shown in the co-pending application, Serial No. 772,069, filed September 4, 1947, by William P. Oehler, now Patent No. 2,644,388, issued July 7, 1953. The forward ends of the parallel frame bar sections are apertured, as at 38, forming attachment means by which the front portion of the frame 23 may be connected to a hitch device or the like.

Secured to the forward portion of the frame bars 31 and 32 is a crossbar 41, preferably welded to the bars 31 and 32. The crossbar 41 extends laterally outwardly beyond the frame 23, forming outrigger arms 42 and 43 which are apertured to receive vertical pivot members 44. Mounted on each of the laterally outwardly extending bar sections or outrigger arms is a transversely disposed lever 46, the intermediate portion of which is apertured to receive the pivot member 44. The laterally inner end portions of the two levers 46 pass under a yoke 47 which is secured rigidly, as by welding, to the associated frame bar with sufficient space to accommodate the inner end portion of the lever while preventing any upward displacement of the inner end of the lever. The inner ends of the levers 46 overlap and are apertured to receive a common pivot member 49 by which the two levers are connected to swing together about the vertical axes defined by the pivot member 44. A yoke member 51 embraces the overlapping ends of the levers 46 and is apertured to receive the pivot member 49. The apertures in the overlapping end portions of the levers 46 are slotted to accommodate the swinging of the levers 46 about pivots 44 and the fore-and-aft movement of the pivot 49 and yoke 51. The yoke member 51 is also provided with an upwardly disposed, internally threaded boss 52 into which the threaded end of a fore-and-aft extending adjusting member 53 is received. The forward end of the screw-threaded member 53 carries a hand wheel 54, by which the member 53 may be turned when desired, and the forward end of the screw-threaded member 53 is rotatably received in an abutment block or bracket 56 secured, as by welding, to a cross member 57 which rigidly interconnects the forward ends of the main frame bars 31 and 32.

The outer end of each of the levers 46 carries a bifurcated or yoke section 57 which is connected by a swivel bolt 58 to the upper end of a vertical sleeve section 59 in which a vertical standard 61 is slidably disposed. The lower end of the standard 61 is connected with the outer bearing member of the associated front gang by bearing means substantially like that shown in the above mentioned co-pending patent. A stop 62 is fixed to the upper end of the standard 61, above the sleeve 59, and serves thereby as a limit preventing the outer end of the associated gang from moving downwardly relative to the outer end of the associated lever 46, but the outer end of the gang may move upwardly a limited distance. Each lever arm 46 has its laterally inner end portion connected with the laterally outer portion of the associated rear gang 22 by means of a rearwardly and laterally outwardly extending link 65, as at 64, the forward end of which is pivotally connected with the associated lever 46, inwardly of the pivot 44, and its laterally outer or rear end is pivotally connected, as by a pin 66 or the like, with the laterally outer portion of the associated rear gang, preferably through a fore-and-aft extending apertured member 67. By placing the pivot 66 in any selected one of the apertures in the member 67, the angular relation between the rear gang and the associated front gang may be varied as desired. The vertical swinging of each of the rear gangs relative to the main frame 23 is restrained by a spring device 69 that includes a rod member 71 pivoted to a crossbar 72 that forms a part of the rear gang frame 27, the rod 71 extending slidably through a bracket 73 carried by the rear crossbar 34. Compression springs 74 and 75 are disposed on opposite sides of the associated bracket 73 and lock nuts 76 provide adjusting means by which the effective tension exerted by the springs 74 and 75 may be varied, as desired. Preferably, the parts are so adjusted that the rear gangs are normally held in a level position but some vertical flexibility is provided. However, the flexibility is of limited extent so that when the main frame 23 is raised, as will be referred to below, the rear gangs are held by the spring devices 69 out of contact with the ground.

For leveling the harrow in a generally fore-and-aft direction, we provide an adjusting strut member, indicated in its entirety by the reference numeral 80. This member comprises a lower rod member 81 pivotally connected, as at 82, to the central portion of the rear crossbar 34 of the main frame 23 and encircled by a compression spring 83 the upper end of which bears against the lower end of a sleeve member 85 within which the rod member 81 telescopes. The rod member 81 carries a pin working in a slot in the sleeve member 85 to prevent disconnection of the rod and sleeve. Details of the adjusting strut 80 are shown in our co-pending application, Ser. No. 217,626, filed March 26, 1951, now U. S. Patent No. 2,704,018. The upper end of the sleeve member 85 carries a nut member in which the lower threaded end of a short shaft 87 is received. The shaft 87 is held against axial displacement in a tubular member 88, and a hand wheel 89 is fixed, as by welding, to the outer or forward end of the threaded shaft 87. The upper tubular member 88 carries a transversely apertured boss section 91 and forms an upper attachment means cooperating with the two laterally spaced apart attaching means formed by the forward apertured portions of the frame bars 31 and 32 mentioned above.

The disk harrow of the present invention is admirably adapted to be connected with a farm tractor having the Ferguson system of hydraulically controlled linkage, which is disclosed in detail in U. S. Patent 2,118,181, issued May 24, 1938 to H. G. Ferguson, to which reference may be made if necessary. Briefly, the tractor is constructed with a power operated, hydraulically controlled linkage which includes two laterally swingable tension links 101 and 102 and an upper compression link 103. Through suitable means not shown here, the upper link 103 controls a hydraulic mechanism which under certain conditions acts automatically through a pair of lift links 105 to raise the lower tension links 101 and 102 and thereby raise any implements associated therewith. To the end that the disk harrow of the present invention may readily be connected to the rear ends of the Ferguson links 101, 102 and 103 we provide, according to the principles of the present invention, a hitch frame 110 which includes a vertical structure formed by a pair of upwardly extending, laterally spaced apart bars 111 fixed at their lower ends to a crossbar 112, the laterally outer ends of which have attaching stud sections 113 adapted to receive the rear ball ends of the lower tension links 102 and 103. The crossbar 112, laterally inwardly of the studs 113, is provided with rearwardly extending apertured lugs 115 to which the forward ends of the frame bars 31 and 32 may be pivotally connected, as by any suitable form of bolt or pin means 116. The upper ends of the vertical bars 111 are apertured to receive a pin 117 by which the rear ball end of the upper or compression link 103 may be connected to the hitch frame 110. The latter also carries an upwardly and rearwardly extending bracket structure 118 which is apertured to receive a pin 119 detachably insertable through the apertured boss 91 of the upper tubular member 88 at the front end of the adjustable strut member 80.

When the disk harrow is connected to the hitch frame 110 and the latter connected to the upper and lower links of a tractor provided with the Ferguson system of linkage, the operation of the disk harrow is substantially as follows. The harrow may be leveled in a fore-and-aft direction by turning the hand wheel 89 so as to exert a raising or a depressing effect on the rear end of the main frame 23 which, at its forward end, is pivotally connected with the cross bar 112 of the hitch frame 110. In turning the hand wheel 89 in one direction or the other, the strut member 80 acts between the rear end of the main frame 23 and the upper end of the hitch frame 110. The angle of the gangs may be adjusted, as desired, merely by turning the lower adjusting wheel 54. The harrow may be raised by operating the tractor power lift unit manually, which exerts an upward force through the lift links 105 against the lower tension links 101 and 102, whereby the harrow is bodily raised into a transport position. Lowering the power lift unit of the tractor serves to lower the harrow into an operating position.

The disk harrow of the present invention is also adapted to be connected easily and quickly to other types of rear implement mountings of tractors. For example, certain tractors in use today include a vertically swingable rigid bail 125, raised and lowered by a power lift mechanism of suitable construction. The bail 125 receives the upper part of an adjustable carrier frame 126, the lower portion of which is connected with the tractor by a pair of tension links 127. Secured to the carrier frame 126 is a pair of sway links 128, the rear ends of which are connected to associated coupler fittings 129, each of which carries a pair of attaching pins or studs 131.

In order to provide for connecting the disk harrow of the present invention to a tractor having the tool carrier structure just mentioned, we provide a hitch frame 130 which is substantially like the hitch frame 110 mentioned above except for certain differences necessary to accommodate a tool carrier instead of the Ferguson links. The hitch frame 130 comprises a pair of laterally spaced apart, vertical bars 131 connected at their lower ends to a crossbar 132. The laterally outer ends of the crossbar 132 carry hook members 133 which are so constructed and arranged to be attachable to the studs or pins 134 at the rear ends of the sway links 128. At their upper ends, the hitch bars 131 are apertured to receive the tubular bushing 88 of the disk harrow adjusting strut member 80. Below the lower ends, the bars 131 carry apertured lugs 136 by which a strut member 137 may be connected between the vertical hitch frame 130 and the upper portion of the carrier frame 126. The crossbar 132 carries a pair of rearwardly extending apertured lugs 138 to which the forward ends of the harrow frame bars 31 and 32 are adapted to be pivotally connected, as at 139. When the power lift of the tractor is actuated to raise the bail 125, the disk harrow and hitch frame 130 are raised bodily therewith.

The disk harrow of the present invention is also adapted to be connected to a hitch frame of the wheel type, so as to provide for connecting the harrow in trailing relation to be towed by a tractor in the conventional manner, whereby the harrow may be connected to practically any farm tractor, especially those having a power unit which includes a remote hydraulic ram unit.

Figure 5:
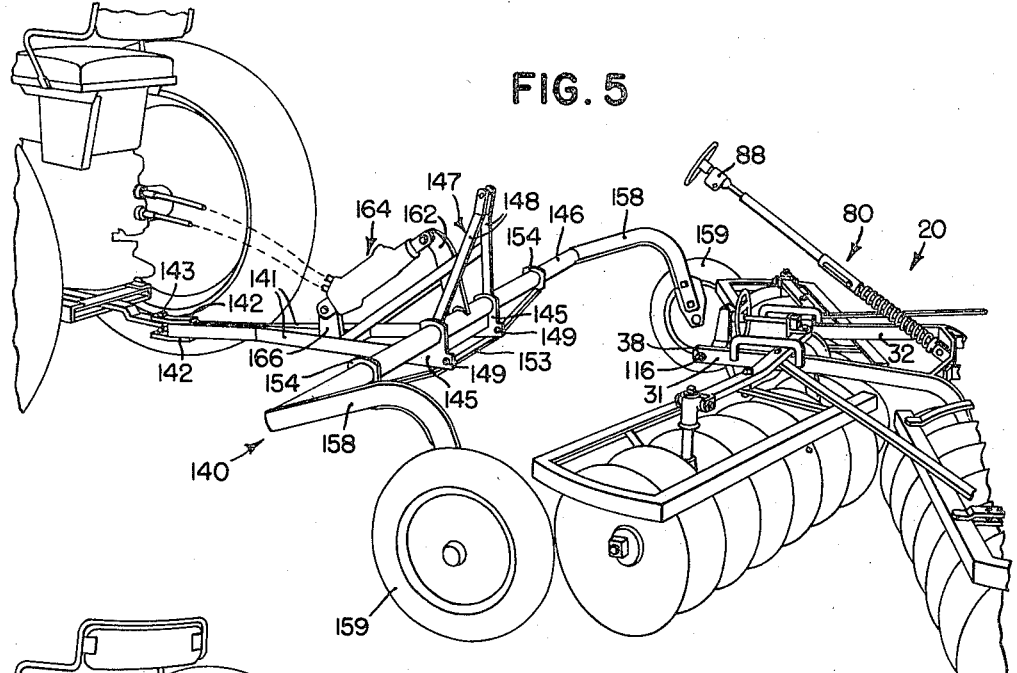
Figure 6:
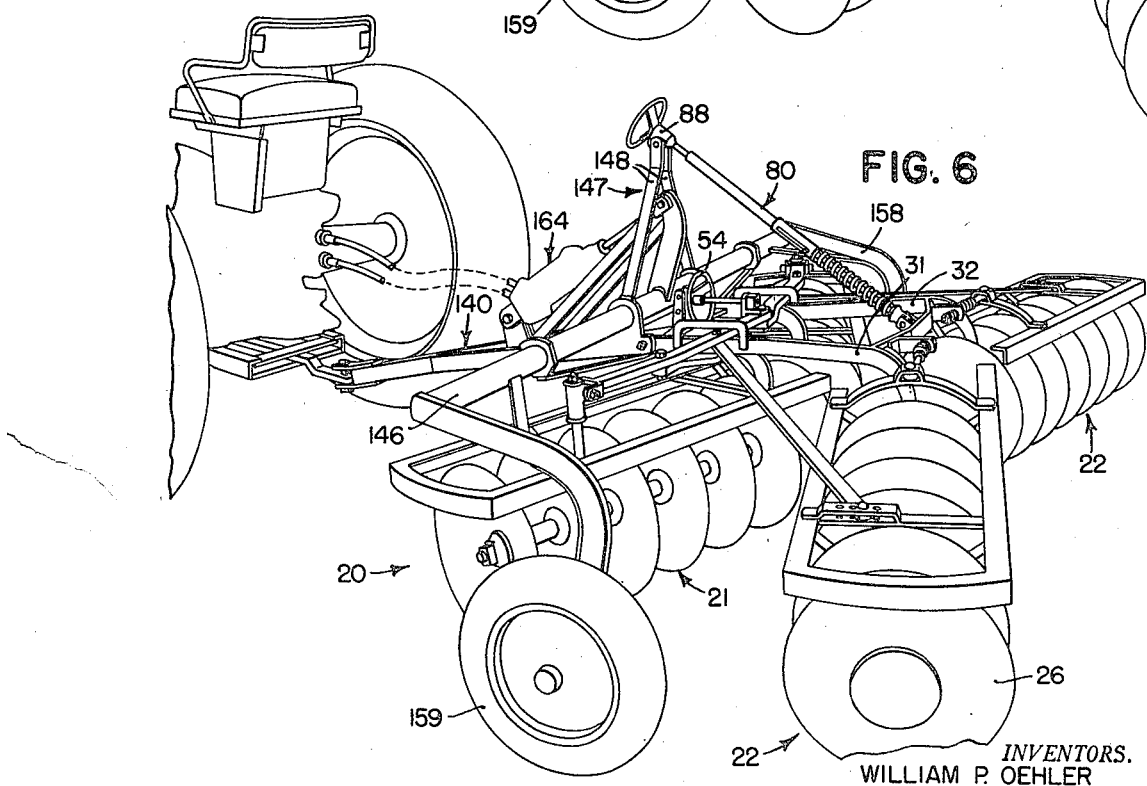

Referring now to Figures 5 and 6, in order to accommodate the connection of the disk harrow of the present invention to a tractor of this type, we provide a hitch frame 140. This unit includes a pair of generally fore-and-aft extending, forwardly converging bars 141, the forward ends of which are provided with upper and lower apertured plates 142 welded or otherwise secured to the forward ends of the bars 141. The plates may be connected by a hitch pin 143 to the drawbar of a conventional tractor. The rear portions of the frame bars 141 are provided with apertured lugs 145 in which a transversely extending wheel shaft 146 is rockably mounted. The lugs 145 are extended upwardly, forming a vertical hitch structure 147, including a pair of upwardly converging bars 148, the uppermost ends of which are apertured to receive a pin by which the tubular bushing 88 of the strut member 80 may be connected thereto. The rear ends of the frame bars 141 are apertured, as as 149, thereby forming laterally spaced apart means for receiving the forward apertured ends of the disk harrow frame bars 31 and 32. The rear portions of the hitch frame bars 141 are reenforced by a crossbar 153, the outer ends of which extend laterally outwardly beyond the frame bars 141 and carry apertured lugs 154 aiding in the support of the wheel shaft 146. The latter member carries crank arms 158, one at each end thereof, and the lower end of each crossbar 148 carries a stub axle on which a ground wheel 159 is journaled. The central portion of the wheel shaft 146 carries an arm 162 rigid therewith, and the upper end of the arm 162 is provided with an apertured section by which the rear end of a hydraulic ram unit 164 may be connected to swing the shaft 146. The forward end of the ram unit may be releasably connected with the frame bars 141 in any suitable manner, as by a bracket 166.

By backing the wheel frame 140 into a position at the front of the harrow, the lower attachment means and the associated pivots 116 may be connected with the rear ends 149 of the bars 141. At the same time, the tubular bushing 88 at the forward end of the adjusting strut member 80 may be connected to the upper ends of the bars 148, whereupon the harrow is connected to be bodily raised and lowered with the wheel frame 140. The raising and lowering of the latter is effected by operating the power lift ram unit 164 to raise and lower the wheels 159. The wheel shaft 146 is of such length that the wheels 159 are disposed laterally outwardly a short distance of the outer ends of the front gangs, but the rear gangs are of such lengths that the laterally outermost disks 26 work any wheel tracks formed by the wheels 159. Since the wheel frame 140 is connected by a single hitch pin to the tractor, the harrow and wheel frame combination as just described may be connected in towed or trailing relation to practically any farm tractor having a rear drawbar.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A double action tandem disk harrow comprising a generally fore-and-aft extending rigid main frame, two pairs of front and rear gangs pivotally connected at their laterally inner ends to said frame, a pair of transversely disposed levers each pivoted at an intermediate point to the forward portion of said frame above the front gangs, means pivotally connecting the outer end of each lever to the laterally outer portion of the associated front gang, adjustable means acting between said frame and the laterally inner ends of said levers for holding said front gangs in different positions of angle relative to said frame, and a link connected at its forward end to the laterally inner end portion of each lever and extending diagonally rearwardly and outwardly and connected at its rear end to the outer end portion of the associated rear gang.

2. A double action tandem disk harrow comprising a rigid main frame, two pairs of front and rear gangs pivotally connected at their laterally inner ends to said frame, a pair of elongated transversely disposed levers pivotally connected at points between their ends to the forward portion of the frame at laterally spaced points thereon, the laterally inner ends of said levers lying adjacent one another, means pivotally connecting the outer ends of said levers with the front gangs at points laterally outwardly of the points of connection of said front gangs with said frame, motion-transmitting means connecting the inner end portions of said levers with the outer ends of said rear gangs, and means connected with the adjacent inner end portions of said levers and acting against said frame for holding said levers in different positions of adjustment.

3. A double action tandem disk harrow comprising a rigid main frame, two pairs of front and rear gangs pivotally connected at their laterally inner ends to said frame, a transversely disposed lever pivoted at a point between its ends to each side of said frame above the front gangs, means pivotally connecting the outer end of each lever to the laterally outer portion of the associated front gang, said means including parts movable vertically one relative to the other, thereby providing limited lost motion between the outer end of each lever and the associated gang, adjustable means acting between said frame and the laterally inner ends of said levers for holding said front gangs in different positions of angle relative to said frame, and a link connected at its forward end to each lever adjacent the laterally inner end thereof and extending diagonally rearwardly and outwardly and connected at its rear end to the outer end portion of the associated rear gang.

4. A double action tandem disk harrow comprising an elongated rigid main frame, two pairs of front and rear gangs pivotally connected at their laterally inner ends to said frame, said frame including transverse bar means having a laterally outwardly extending section at each side of said main frame, a transversely disposed lever pivoted at an intermediate point to the outer end of each of said transverse bar sections, means pivotally connecting the outer end of each lever to the laterally outer portion of the associated front gang, adjustable means acting between said frame and the laterally inner ends of said levers for holding said front gangs in different positions of angle relative to said frame, and a link connected at its forward end to the laterally inner end portion of each lever and extending diagonally rearwardly and outwardly and connected at its rear end to the outer end portion of the associated rear gang.

5. The invention set forth in claim 4, further characterized by said adjustable means comprising a member movable in a fore-and-aft direction on said frame and connected at one end to the laterally inner end of each of said levers, and means for holding said member in different positions of adjustment relative to said main frame.

6. A disk harrow comprising a main frame, a pair of disk gangs pivotally connected at their inner ends to said main frame, means connected with the main frame to raise the latter and said gangs, cantilever-like arms fixed rigidly at their inner ends to said main frame, a pair of laterally outwardly extending levers pivotally connected adjacent their midpoints to the laterally outer ends of said cantilever-like arms, respectively, means carried by said main frame and engageable with the laterally inner ends of said levers for holding the outer ends of the latter against displacement in a generally vertical direction, means pivotally connecting the outer ends of said levers with the outer end portions of said disk gangs whereby the outer ends of the latter are supported on said levers when the main frame is raised, means shiftable longitudinally of said main frame, and means including pivot means connecting said shiftable means with the laterally inner ends of said levers for swinging the latter to adjust the angle of said gangs.

7. A disk harrow as defined in claim 6, further characterized by the laterally inner ends of said levers overlapping and having slotted apertures adapted to be brought into axial alignment and said pivot means extending through said slotted apertures for swinging said levers to angle said gangs.

8. A disk harrow comprising a main frame, a pair of disk gangs pivotally connected at their inner ends to said main frame, means connected with the main frame to raise the latter and said gangs, cantilever-like arms fixed rigidly at their inner ends to said main frame, a pair of laterally outwardly extending levers pivotally connected adjacent their midpoints to the laterally outer ends of said cantilever-like arms, respectively, means fixedly carried by said main frame and engageable with said levers laterally inwardly of their pivotal connection with said arms so as to restrain displacement of the ends of said levers in a generally vertical direction, means pivotally connecting the outer ends of said levers with the outer end portions of said disk gangs, means shiftable longitudinally of said main frame, and means including pivot means connecting said shiftable means with the laterally inner ends of said levers for swinging the latter to adjust the angle of said gangs.

9. A disk harrow comprising a frame including a pair of frame bars extending generally fore and aft in laterally spaced apart relation and front and rear cross bars rigidly connecting said frame bars, pairs of front and rear gangs, each pivotally connected at its inner end to front and rear portions of said frame bars, the front cross bar extending at its ends laterally outwardly of said frame bars, a generally laterally extending lever pivotally connected at an intermediate point to each laterally outer end of said front cross bar, a sleeve swivelly connected with the outer end of each lever, a bar slidable at its upper end portion within each sleeve and pivotally connected at its lower end with the associated disk gang laterally outwardly of the point of its pivotal connection with said frame, motion-transmitting means connecting the laterally inner portion of each lever with the associated rear gang laterally outwardly of its pivotal connection with said frame, motion-limiting means acting between said frame and the inner ends of said rear gangs at points thereon above the points of their pivotal connection with said frame, means acting between said frame and the inner ends of said levers for limiting displacement of the latter in a generally vertical direction, and means connected with the inner ends of said levers and accommodating a pivotal movement of the latter about their pivotal connection with the laterally outer ends of said front crossbar for swinging said gangs in a generally horizontal plane relative to said frame.

10. A disk harrow comprising a main frame, front and rear disk gangs pivotally connected at their laterally inner ends to said frame, means movably carried by said frame and operatively connected with the laterally outer ends of said front and rear gangs for changing the positions thereof relative to said frame, an adjustable strut member pivotally connected at its rear portion with the rear portion of said main frame, a hitch device having lower laterally spaced attachment means adapted to pivotally receive the forward portion of said main frame and an upper section adapted to pivotally receive the forward portion of said strut member, said front gangs including gang frames, and motion-limiting means associated with said first-mentioned means for limiting the downward movement of the outer ends of said front gangs when the harrow is suspended, and motion-limiting means associated with said first-mentioned means and including angling bars extending over the gang frames of said front gangs rearwardly and laterally outwardly to and connected with the outer portions of said rear gangs.

11. The combination set forth in claim 10, further characterized by said hitch device including a cross bar carrying said lower laterally spaced attachment means and a pair of laterally spaced apart hook members, a vertical section carrying said upper section and fixed at its lower end to the intermediate portion of said crossbar, and means at the upper end portion of said vertical section for connecting said hitch device to a tractor.

12. A double action tandem disk harrow comprising a rigid main frame, two pairs of front and rear gangs pivotally connected at their laterally inner ends to said frame, generally horizontal members pivotally mounted on said main frame and connected with the outer ends of said front gangs for changing the working angle thereof, each of said front gangs including a gang frame, means on said main frame for limiting vertical movement of said members, and rear gang angling links pivotally connected at their front ends with said generally horizontal members adjacent said movement limiting means and extending generally rearwardly over the rear portions of said front gang frames and connected at their rear ends with said rear gangs, said gang angling links engaging the front gang frames and reacting against said members to limit downward movement of the outer ends of said rear gangs.

13. A double action tandem disk harrow comprising a rigid main frame, two pairs of front and rear gangs pivotally connected at their laterally inner ends to said frame, generally horizontal members pivotally mounted on said main frame and connected with the outer ends of said front gangs for changing the working angle thereof, each of said front gangs including a gang frame, means on said main frame for limiting vertical movement of said members, and rear gang angling links pivotally connected at their front ends with said members and extending generally rearwardly over the rear portions of said front gang frames and connected at their rear ends with said rear gangs, said gang angling links engaging the front gang frames and reacting against said members to limit downward movement of the outer ends of said rear gangs, means on said main frame for limiting vertical movement of said members including parts fixed to said main frame and engaging the upper portions of the adjacent parts of said generally horizontal members, adjacent the points of connection of said angling links therewith.

(References on following page)

References Cited in the file of this patent

UNITED STATES PATENTS

| | | | |
|---|---|---|---|
| 1,189,890 | Warne | July 4, | 1916 |
| 1,286,986 | French | Dec. 10, | 1918 |
| 2,320,624 | Love | June 1, | 1943 |
| 2,414,114 | Martin | Jan. 14, | 1947 |
| 2,440,550 | Martin | Apr. 27, | 1948 |
| 2,456,693 | Fraga | Dec. 21, | 1948 |
| 2,552,307 | Bowman | May 8, | 1951 |
| 2,600,331 | Rude | June 10, | 1952 |
| 2,638,726 | Sawyer | May 19, | 1953 |